US011211965B2

(12) United States Patent
Oh et al.

(10) Patent No.: US 11,211,965 B2
(45) Date of Patent: Dec. 28, 2021

(54) ELECTRONIC DEVICE AND METHOD FOR PROVIDING COMMUNICATION SERVICE

(71) Applicant: Samsung Electronics Co., Ltd., Suwon-si (KR)

(72) Inventors: Ki-Young Oh, Suwon-si (KR); Joon-Won Jang, Yongin-si (KR); Yeong-Seob Lim, Seoul (KR); Ryan Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/880,033

(22) Filed: May 21, 2020

(65) Prior Publication Data
US 2020/0287585 A1 Sep. 10, 2020

Related U.S. Application Data

(63) Continuation of application No. 15/129,627, filed as application No. PCT/KR2015/003245 on Apr. 1, 2015, now abandoned.

(30) Foreign Application Priority Data

Apr. 1, 2014 (KR) .......................... 10-2014-0038621

(51) Int. Cl.
*H04B 1/00* (2006.01)
*H04W 88/02* (2009.01)
(Continued)

(52) U.S. Cl.
CPC ............. *H04B 1/44* (2013.01); *H04B 1/0053* (2013.01); *H04B 1/406* (2013.01); *H04B 7/26* (2013.01); *H04W 88/02* (2013.01); *H04W 88/06* (2013.01)

(58) Field of Classification Search
CPC .... H04B 1/3816; H04B 1/406; H04B 7/2643; H04B 7/18563; H04B 7/26; H04B 17/309;
(Continued)

(56) References Cited

U.S. PATENT DOCUMENTS 7,917,113 B2   3/2011  Palenius et al.
8,331,289 B1  12/2012  Lee et al.
(Continued)

FOREIGN PATENT DOCUMENTS

CN  1965520 A   5/2007
CN  102064845 A  5/2011
(Continued)

OTHER PUBLICATIONS

Chinese Office Action in corresponding application No. 201580017650.X dated Sep. 3, 2018.
(Continued)

*Primary Examiner* — Yuwen Pan
*Assistant Examiner* — Paul P Tran
(74) *Attorney, Agent, or Firm* — Jefferson IP Law, LLP

(57) ABSTRACT

Disclosed an apparatus and a method for simultaneously providing a voice service and a data service in an electronic device. The electronic device includes: an antenna for transmitting or receiving one or more signals of a first signal corresponding to a first communication network and a second signal corresponding to a second communication network; a first communication control module for processing the first signal; a second communication control module for processing the second signal; and a divider for distributing the one or more signals received through the antenna to the first communication control module and the second communication control module.

9 Claims, 10 Drawing Sheets

(51) Int. Cl.
*H04W 88/06* (2009.01)
*H04B 1/44* (2006.01)
*H04B 1/403* (2015.01)
*H04B 7/26* (2006.01)

(58) Field of Classification Search
CPC .. H04B 17/382; H04B 1/0053; H04B 1/0057;
H04B 1/006; H04B 1/0067; H04B
1/0096; H04B 1/109; H04B 1/44; H04B
1/401; H04B 1/48; H04B 1/50; H04B
1/52; H04B 1/525; H04W 8/245; H04W
28/04; H04W 48/18; H04W 52/02; H04W
80/04; H04W 88/02; H04W 88/06; H04W
16/14; H04W 36/0088; H04W 36/14;
H04W 48/16; H04W 48/20; H04W
52/0229; H04W 56/001; H04W 60/005;
G06F 1/3203; G06F 21/10; H03H 7/0115;
H03H 7/0153; H03H 7/0161; H03H 7/46;
H03H 7/48; H04L 5/001; H04L 5/14;
H04L 27/0006; H04L 27/2626; H04L
27/2647
See application file for complete search history.

(56) References Cited

U.S. PATENT DOCUMENTS

| | | | |
|---|---|---|---|
| 8,804,624 B1 | 8/2014 | Lee et al. | |
| 2006/0234710 A1* | 10/2006 | Noh | H04W 36/14 455/436 |
| 2007/0014260 A1* | 1/2007 | Seo | H04W 36/14 370/331 |
| 2007/0155344 A1 | 7/2007 | Wiessner et al. | |
| 2008/0253345 A1 | 10/2008 | Sanguinetti | |
| 2009/0028276 A1 | 1/2009 | van Rooyen | |
| 2009/0258607 A1 | 10/2009 | Beninghaus et al. | |
| 2010/0148986 A1* | 6/2010 | Aunkofer | B60C 23/0438 340/12.5 |
| 2010/0189031 A1* | 7/2010 | Kanou | H01Q 1/24 370/328 |
| 2010/0227570 A1* | 9/2010 | Hendin | H04B 1/406 455/78 |
| 2011/0014958 A1 | 1/2011 | Black et al. | |
| 2012/0135782 A1 | 5/2012 | Wang | |
| 2012/0294205 A1 | 11/2012 | Fan | |
| 2013/0016632 A1* | 1/2013 | Mujtaba | H04B 7/0608 370/275 |
| 2013/0028147 A1 | 1/2013 | Black | |
| 2013/0083775 A1 | 4/2013 | Sun et al. | |
| 2013/0142088 A1 | 6/2013 | Li et al. | |
| 2014/0177690 A1 | 6/2014 | Kochetkov et al. | |
| 2014/0364165 A1* | 12/2014 | Kim | H04W 88/06 455/552.1 |
| 2015/0303951 A1* | 10/2015 | Zhou | H04B 1/0057 370/280 |
| 2016/0366031 A1* | 12/2016 | Xu | H04B 1/56 |

FOREIGN PATENT DOCUMENTS

| | | |
|---|---|---|
| CN | 102420630 A | 4/2012 |
| GB | 2494300 A | 3/2013 |
| GN | 103181091 A | 6/2013 |
| GN | 103731179 A | 4/2014 |
| GN | 104348504 A | 2/2015 |
| KR | 10-2012-0011762 A | 2/2012 |
| KR | 10-2013-0006758 A | 1/2013 |
| KR | 10-2013-0024505 A | 3/2013 |
| KR | 10-2013-0056634 A | 5/2013 |
| KR | 10-2013-0137412 A | 12/2013 |
| WO | 98/09382 A1 | 3/1998 |

OTHER PUBLICATIONS

Chinese Office Action dated Mar. 19, 2019, issued in Chinese Patent Application No. 201580017650.X.
Chinese Office Action dated Aug. 26, 2019, issued in Chinese Patent Application No. 201580017650.X.
Korean Office Action with English translation dated Feb. 5, 2020; Korean Patent Application No. 10-2014-0038621.
Korean Office Action with English translation dated Oct. 26, 2020; Korean Patent Application No. 10-2014-0038621.
Chinese Office Action with English translation dated Apr. 26, 2021; Chinese Appln No. 202010313935.0.
European Search Report dated Jun. 15, 2021; European Appln. No. 15 773 357.7-1216.

* cited by examiner

ELECTRONIC DEVICE AND METHOD FOR PROVIDING COMMUNICATION SERVICE

CROSS-REFERENCE TO RELATED APPLICATION(S)

This application is a continuation application of prior application Ser. No. 15/129,627, filed on Sep. 27, 2016, which was the National State of International application PCT/KR2015/003245, filed on Apr. 1, 2015, which was based on and claimed priority under 35 U.S.C § 119(a) of a Korean patent application number 10-2014-0038621, filed on Apr. 1, 2014, in the Korean Intellectual Property Office, the disclosure of which is incorporated by reference herein in its entirety.

TECHNICAL FIELD

The present disclosure relates to an apparatus and a method for providing a communication service in an electronic device.

BACKGROUND ART

Wireless communication systems are developing into broadband wireless communication systems that provide high speed and high quality packet data services beyond voice services.

According to the development of wireless communication systems, an electronic device supporting wireless communications may provide a plurality of communication services through a plurality of communication networks. For example, the electronic device may provide both a voice call service and a data service through a Circuit Switching (CS) network (for example, a Code Division Multiple Access (CDMA) network) providing the voice call service and a Packet Switching (PS) network (for example, a Long Term Evolution (LTE) network) providing the data service.

DISCLOSURE OF INVENTION

Solution to Problem

As described above, when a plurality of communication services are provided, the electronic device should include a communication module (for example, a Radio Frequency Integrated Chip (RFIC) or an antenna) for each of the communication systems. Accordingly, the electronic device increases in size or manufacturing costs to provide the plurality of communication services.

Embodiments of the present disclosure provide an apparatus and a method for providing a plurality of communication services with a small number of components.

In accordance with an aspect of the present disclosure, an electronic device includes: an antenna for transmitting or receiving one or more signals of a first signal corresponding to a first communication network and a second signal corresponding to a second communication network; a first communication control module for processing the first signal; a second communication control module for processing the second signal; and a divider for distributing the one or more signals received through the antenna to the first communication control module and the second communication control module.

BRIEF DESCRIPTION OF DRAWINGS

The above and other aspects, features, and advantages of the present disclosure will be more apparent from the following detailed description taken in conjunction with the accompanying drawings, in which.

BEST MODE FOR CARRYING OUT THE INVENTION

Figure 1:
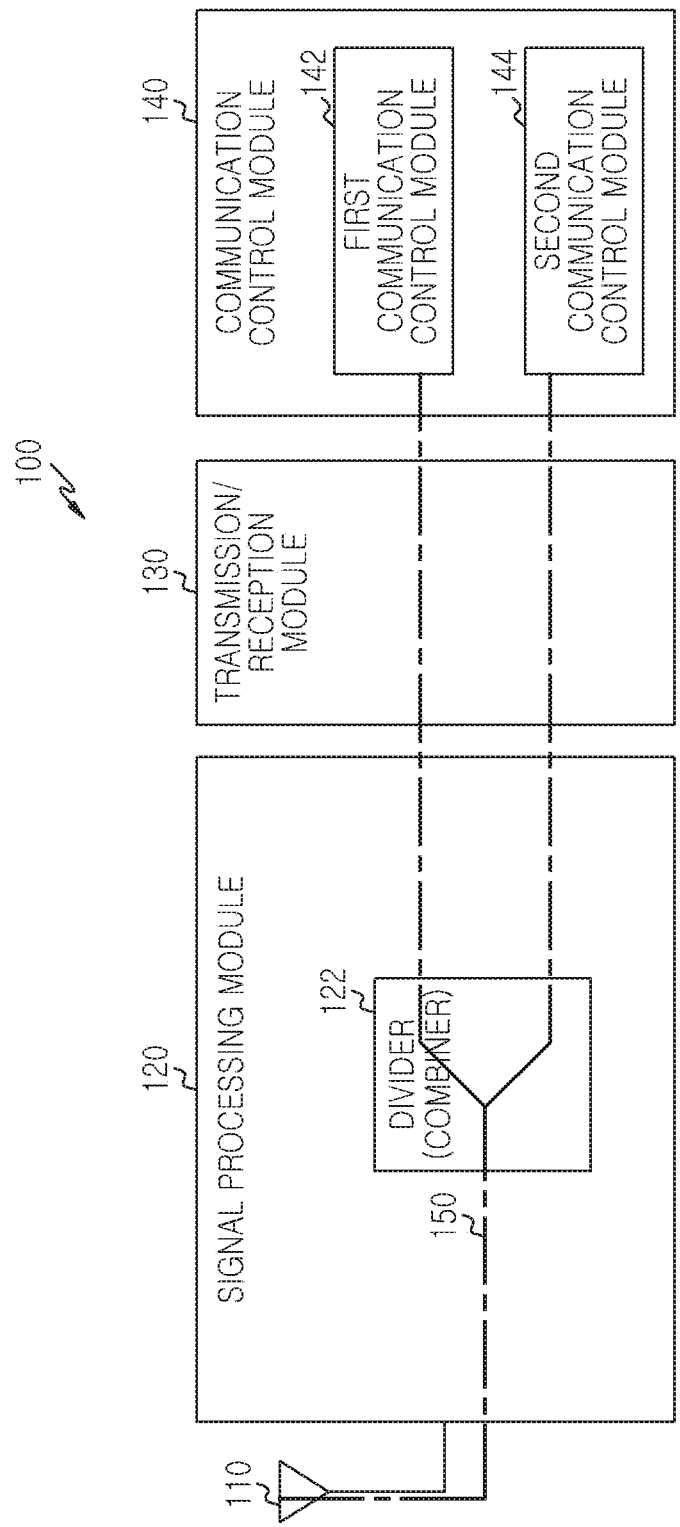
FIG. 1 is a block diagram of an electronic device according to an embodiment of the present disclosure.

Hereinafter, various embodiments of the present disclosure may be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, without departing from the scope of the present disclosure, a first structural element may be named a second structural element. Similarly, the second structural element also may be named the first structural element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are merely for the purpose of describing particular embodiments and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to an embodiment of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to some embodiments, the electronic device may be a smart home appliance with a communication function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to the various embodiments will be described with reference to the accompanying drawings. In various embodiments, the term "user" may indicate a person using an electronic device or a device (e.g. an artificial intelligence electronic device) using an electronic device.

The following embodiments of the present disclosure describe a technology in which an electronic device provides a plurality of communication service together.

FIG. 1 is a block diagram of an electronic device according to an embodiment of the present disclosure.

Referring to FIG. 1, an electronic device 100 may include an antenna 110, a signal processing module 120, a transmission/reception module 130, and a communication control module 140.

The antenna 110 may be functionally connected to the electronic device 100 to transmit/receive signals for one or more communication services (for example, voice call service or data service) which may be provided by the electronic device 100. According to one embodiment, the antenna 110 may simultaneously or sequentially transmit or receive at least one of a signal of a first communication network and a signal of a second communication network.

According to one embodiment, the antenna 110 functionally connected to the electronic device 100 may include an antenna included in the electronic device 100 or an antenna included in an external device which communicates with the electronic device 100.

According to one embodiment, the first communication network may be a Circuit Switching (CS) network which applies a transmission technology such as Code Division Multiple Access (CDMA) 1x, Wideband-CDMA (WCDMA), Time Division-Synchronous CDMA (TD-CDMA), Evolution-Data Optimized (EV-DO), or Global System for Mobile communications (GSM). The second communication network may be a Packet Switching (PS) network which uses a transmission technology such as Long Term Evolution (LTE) or mobile Wimax. In contrast, the first communication network may be the PS network and the second communication network may be the CS network. Although a case where the first communication network and the second communication network are the CS network or the PS network (or converse thereof) is described for the convenience of description, the first communication network and the second communication network may be different communication networks using different transmission technologies according to various embodiments of the present disclosure. For example, the first communication network may be the CS network using a CDMA transmission technology and the second communication network may be the CS network using a GSM transmission technology. For example, the first communication network may be the CS network using a WCDMA transmission technology and the second communication network may be the CS network using an LTE transmission technology.

According to one embodiment, the signal of the first communication network and the signal of the second communication network may be signals included in the same (overlapping) or adjacent frequency bands. For example, the signal of the first communication network may be a signal corresponding to band 2 of LTE network (1900 MHz) and the signal of the second communication network may be a signal corresponding to band 1 of CDMA (1900 MHz). For example, the signal of the first communication network may be a signal corresponding to band 5 of LTE (850 MHz) and the signal of the second communication network may be a signal corresponding to band 0 of CDMA (800 MHz).

According to one embodiment, the signal of the first communication network and the signal of the second communication network may be signals included in the same frequency band or different frequency bands (for example, channels) within adjacent frequency bands. For example, the signal of the first communication network may be a signal corresponding to the part of the frequency band (downlink 1930 MHz to 1990 MHz) of band 2 of LTE network and the signal of the second communication network may be a signal corresponding to the part of the frequency band (downlink: 1930 MHz to 1990 MHz) of band 1 of CDMA network. For example, the signal of the first communication network and the signal of the second communication network may be signals of different frequency bands or frequency bands which partially overlap each other. According to one embodiment, a frequency band corresponding to the signal of the first communication network and a frequency band corresponding to the signal of the second communication network may be randomly allocated by, for example, a base station.

According to one embodiment, the signal processing module 120 may distribute signals received by the signal processing module 120 through the antenna 110 to a plurality of communication control modules (for example, a first communication control module 142 or a second communication control module 144). For example, the signal processing module 120 may distribute and transmit the signals received by the signal processing module 120 to the first communication control module 142 and the second communication control module 144. In this case, the signals received by the signal processing module 120, the signal transmitted to the first communication control module 142, and the signal transmitted to the second communication control module 144 may be equal or similar signals, and at least one of power, voltage, and current of the signals may be different.

For example, when the signal processing module 120 receives the signal of the first communication network (for example, CS network) and the signal of the second communication network (for example, PS network) through the antenna 110, the signal processing module 120 may transmit the signals (for example, the signal of the first communication network and the signal of the second communication network) received through the antenna 110 to the first communication control module 142 and the second communication control module 144, respectively as indicated by reference numeral 150. In this case, power (for example, 7 dB) of the signal transmitted to the first communication control module 142 and power (for example, 7 dB) of the signal transmitted to the second communication module 144 may be, for example 50% of power (for example, 10 dB) of the signal received by the signal processing module 120 through the antenna 110. For convenience of description, although an example in which the power of the signal transmitted to each of the first communication control module 142 and the second communication control module 144 is 50% of the power of the signal received by the signal processing module 120 has been described, the power of the signal transmitted to each of the first communication control module 142 and the second communication control module 144 is not limited thereto according to various embodiments of the present disclosure. For example, the power of the signal transmitted to the first communication control module 142 may be 30% of the power of the signal received by the signal processing module 120, and the power of the signal transmitted to the second communication control module 144 may be 60% of the power of the signal received by the signal processing module 120.

According to one embodiment, the signal processing module 120 may combine signals received from a plurality of communication control modules (For example, the first communication control module 142 and the second communication control module 144) into one signal and provide the combined signal to the antenna 110. For example, the signal processing module 120 may receive the signal of the first communication network (for example, the CS network) from the first communication control module 142 and receive the signal of the second communication network (for example, the PS network) from the second communication control module 144. The signal processing module 120 may combine the signal of the first communication network (for example, the CS network) and the signal of the second communication network (for example, the PS network) which are received by the signal processing module 120 into one signal and provide the combined signal to the antenna 110.

According to one embodiment, the signal processing module 120 may include a divider/combiner 122 which is functionally connected to the electronic device 100 or physically or logically separated from the electronic device 100. The divider 122 may distribute and provide, for example, the signal received by the signal processing module 120 through the antenna 110 to each of the first communication control module 142 and the second communication control module 144. The combiner 122 may combine the signals received from the first communication control module 142 and the second communication control module 144 and provide the combined signal to the antenna 110.

According to one embodiment, the divider/combiner 122 functionally connected to the electronic device 100 may include, for example, the divider/combiner 122 included in the electronic device 100 or the divider/combiner 122 included in an external device which communicates with the electronic device 100.

Additionally or alternatively, according to one embodiment, the signal processing module 120 may further include an amplifier (for example, a Low Noise Amplifier (LNA)) for amplifying a signal received between the antenna 110 and the divider in order to calibrate transmission performance loss. According to one embodiment, the signal processing module 120 may further include TX calibration between the antenna 110 and the combiner in order to calibrate the transmission performance.

According to one embodiment, the transmission/reception module 130 may control an operation for transmitting a signal to the antenna 110 and an operation for receiving a signal from the antenna 110. The transmission/reception module 130 may change a Radio Frequency (RF) signal into a baseband signal and transmit the baseband signal to the communication control module 140 (for example, the first communication control module 142 or the second communication control module 144). The transmission/reception module 130 may change, for example, an analog signal corresponding to a baseband to an RF signal and transmit the RF signal to the antenna 110.

According to one embodiment, the communication control module 140 may process (for example, demodulate) signals of one or more communication networks included in the signals received through the transmission/reception module 130. For example, the communication control module 140 may include the first communication control module 142 (for example, a modem) and the second communication control module 144 (for example, a modem), which are logically or physically separated from each other, so as to process (for example, demodulate) signals of a plurality of communication networks. For example, the first communication control module 142 may process the signal of the first communication network (or the signal of the second communication network) and the second communication module 144 may process the signal of the second communication network (or the signal of the first communication network). For example, when the first communication control module 142 may process the signal of the first communication network (for example, the CS network) and the second communication control module 144 may process the signal of the second communication network (for example, the PS network), the transmission/reception module 130 may transmit the signal of the first communication network and the signal of the second communication network to, for example, the first communication control module 142 and the second communication control module 144 at the same time. The first communication control module 142 may demodulate the signal of the first communication network between the signal of the first communication network and the signal of the second communication network which are provided from the transmission/reception module 130. When the first communication control module 142 demodulates the signal of the second communication network or demodulates an overlapping signal between the signal of the first communication network and the signal of the second communication network, the first communication control module 142 may recognize that there is an error in the signal provided from the transmission/reception module 130 and transmit feedback of error generation information to the base station. Further, the second communication control module 144 may demodulate the signal of the second communication network between the signal of the first communication network and the signal of the second communication network which are provided from the transmission/reception module 130. When the second communication control module 144 demodulates the signal of the first communication network or demodulates an overlapping signal between the signal of the first communication network and the signal of the second communication network, the second communication control module 144 may recognize that there is an error in the signal provided from the transmission/reception module 130 and transmit feedback of error generation information to the base station.

Additionally or alternatively, the first communication control module 142 may provide a voice call service (or a data service) by using the signal of the first communication network (or the signal of the second communication network) processed (for example, demodulated) by the first communication control module 142. Further, the second communication control module 144 may provide a data service (or a voice call service) by using the signal of the second communication network (or the signal of the first communication network) processed (for example, demodulated) by the second communication control module 144. For example, the first communication control module 142 may provide the voice call service (for example, a voice service) by using the demodulated signal of the CS network. The second communication control module 144 may provide the data service (for example, an Internet or SNS service) or the voice call service (for example, Voice of LTE (VoLTE)) by using the demodulated signal of the PS network. For convenience of the description, although it has been described that the first communication control module 142 provides the voice call service, and the second communication control module 144 provides the data service, the present disclosure is not limited thereto according to various embodiments. According to various embodiments, for example, both the first communication control module 142 and the second communication control module 144 may provide the voice call service (or the data service).

The electronic device 100 may provide a plurality of communication services, which simultaneously provide the voice call service (for example, a voice service) and the data service by using, for example, the first communication control module 142 (for example, modem) and the second communication control module 144 (for example, modem). The plurality of communication services may include a Simultaneous Voice and LTE (SVLTE)/Simultaneous GSM and LTE (SGLTE) service which provides both the voice call service through the CS network and the data service through the LTE network. The CS network may include at least one of the 2G communication network and the 3G communication network.

Figure 2A:
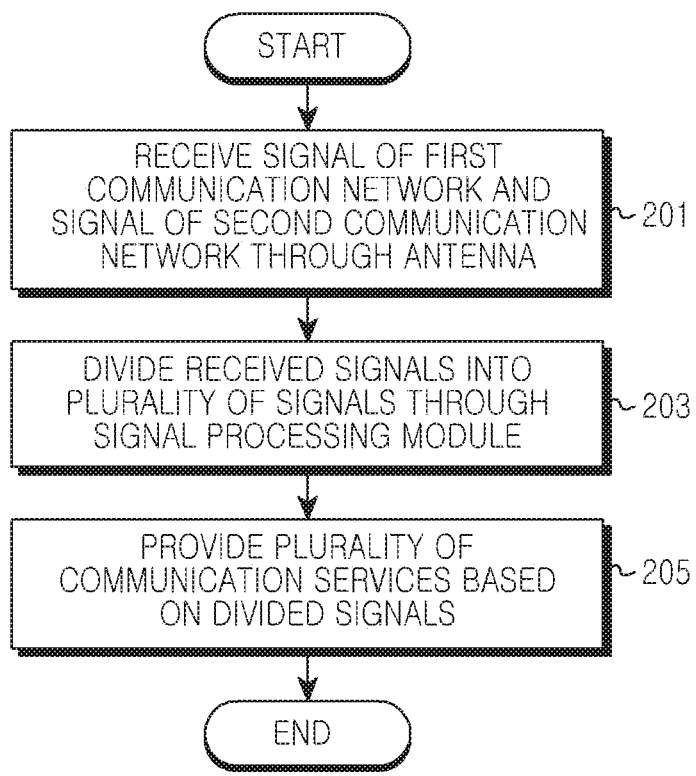
FIGS. 2A and 2B illustrate a process in which an electronic device provides a plurality of communication services according to an embodiment of the present disclosure.

FIG. 2A illustrates a process in which an electronic device provides a plurality of communication services according to an embodiment of the present disclosure.

Referring to FIG. 2A, an electronic device (for example, the electronic device 100) may receive a signal of a first communication network (for example, a CS network) and a signal of a second communication network (for example, a PS network) through an antenna (for example, the antenna 110). According to one embodiment, the electronic device 100 may receive at least one of the signal of the first communication network and the signal of the second communication network through the antenna 110.

The electronic device may divide the signal received through the antenna (for example, the antenna 110) by using a signal processing module (for example, the signal processing module 120) into a plurality of signals in operation 203. According to one embodiment, the signal processing module 120 of the electronic device 100 may divide the signal received through the antenna 110 by using the divider 122 into a plurality of signals, and transmit the signals to communication control modules (for example, the first communication control module 142 or the second communication control module 144). In this case, the signals received by the signal processing module 120, the signal transmitted to the first communication control module 142, and the signal transmitted to the second communication control module 144 may be equal or similar signals, and at least one of power, voltage, and current of the signals may be different.

The electronic device may simultaneously provide a service using the first communication network (for example, a voice call service) and a service using the second communication network (for example, a data service) by using each of the divided signals through the signal processing module (for example, the signal processing module 120) in operation 205. According to one embodiment, the transmission/reception module 130 of the electronic device 100 may transmit the signals divided by the signal processing module 120 to, for example, the first communication control module 142 and the second communication control module 144 at the same time. The first communication control module 142 may provide a voice call service (or a data service) by using the signal of the first communication network (or the signal of the second communication network) provided from the transmission/reception module 130. The second communication control module 144 may provide a data service (or a voice call service) by using the signal of the second communication network (or the signal of the first communication network) provided from the transmission/reception module 130.

Figure 2B:
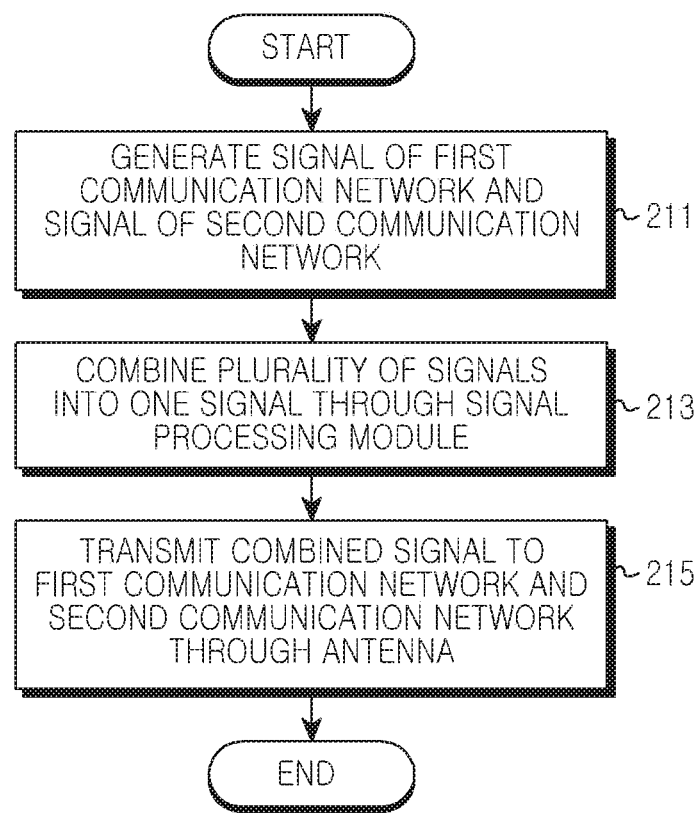

FIG. 2B illustrates a process in which an electronic device provides a plurality of communication services according to an embodiment of the present disclosure.

Referring to FIG. 2B, an electronic device (for example, the electronic device 100) may generate at least one of the signal (for example, a voice call service signal) to be transmitted through the first communication network and the signal (for example, a data service signal) to be transmitted through the second communication network in operation 211. According to one embodiment, the first communication control module 142 of the electronic device 100 may generate the signal for the service using the first communication network, and the second communication control module 144 may generate the signal for the service using the second communication network.

The electronic device may combine the signal (for example, the voice call service signal) to be transmitted through the first communication network and the signal (for example, the data service signal) to be transmitted through the second communication network into one signal by using a signal processing module (for example, the signal processing module 120) in operation 213. For example, the signal processing module 120 of the electronic device 100 may combine the signal to be transmitted through the first communication network and the signal to be transmitted through the second communication network into one signal by using the combiner 122.

The electronic device may transmit the one signal combined by the signal processing module to the first communication network (for example, the CS network) and the second communication network (for example, the PS network) through the antenna (for example, the antenna 110) in operation 215.

Figure 3:
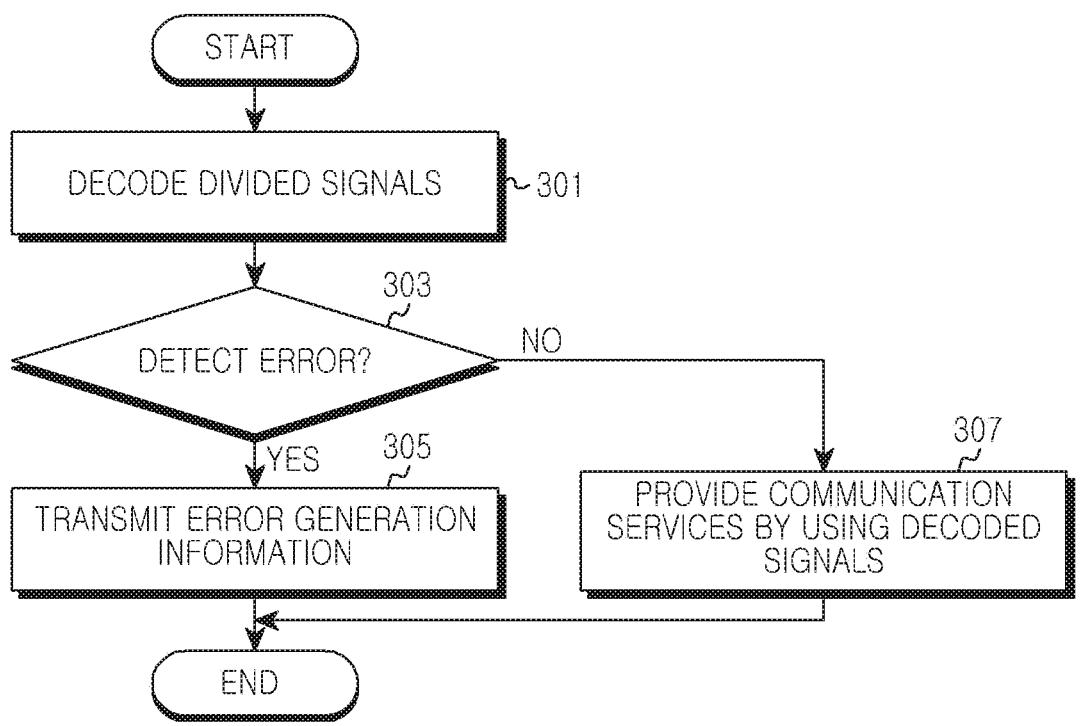
FIG. 3 illustrates a process in which an electronic device provides a communication service using divided signals according to an embodiment of the present disclosure.

FIG. 3 illustrates a process in which an electronic device provides a communication service using divided signals according to an embodiment of the present disclosure.

Referring to FIG. 3, when the signal received through the antenna (for example, the antenna 110) is divided into a plurality of signals by the signal processing module (for example, the signal processing module 120) in operation 203 of FIG. 2, the electronic device (for example, the electronic device 100) may demodulate the divided signals in operation 301. According to one embodiment, the transmission/reception module 130 of the electronic device 100 may transmit the signals divided by the signal processing module 120 to, for example, the first communication control module 142 and the second communication control module 144 at the same time. Each of the first communication control module 142 and the second communication control module 144 may demodulate the signal provided from the transmission/reception module 130.

The electronic device may identify whether an error received through the antenna (for example, the antenna 110) is detected based on a result of the demodulation of the signal in operation 303.

When the error is detected in the signal in operation 303, the electronic device may transmit error generation information to a serving node (for example, the base station) in operation 305. According to one embodiment, when the first communication control module 142 detects the error in the signal, the first communication control module 142 may transmit feedback of the error generation information to the serving node of the first communication network. Further, when the second communication control module 144 detects the error in the signal, the second communication control module 144 may transmit feedback of the error generation information to the serving node of the second communication network.

When the error is not detected in the signal in operation 305, the electronic device may provide the communication service by using the demodulated signal in operation 307.

Figure 4:
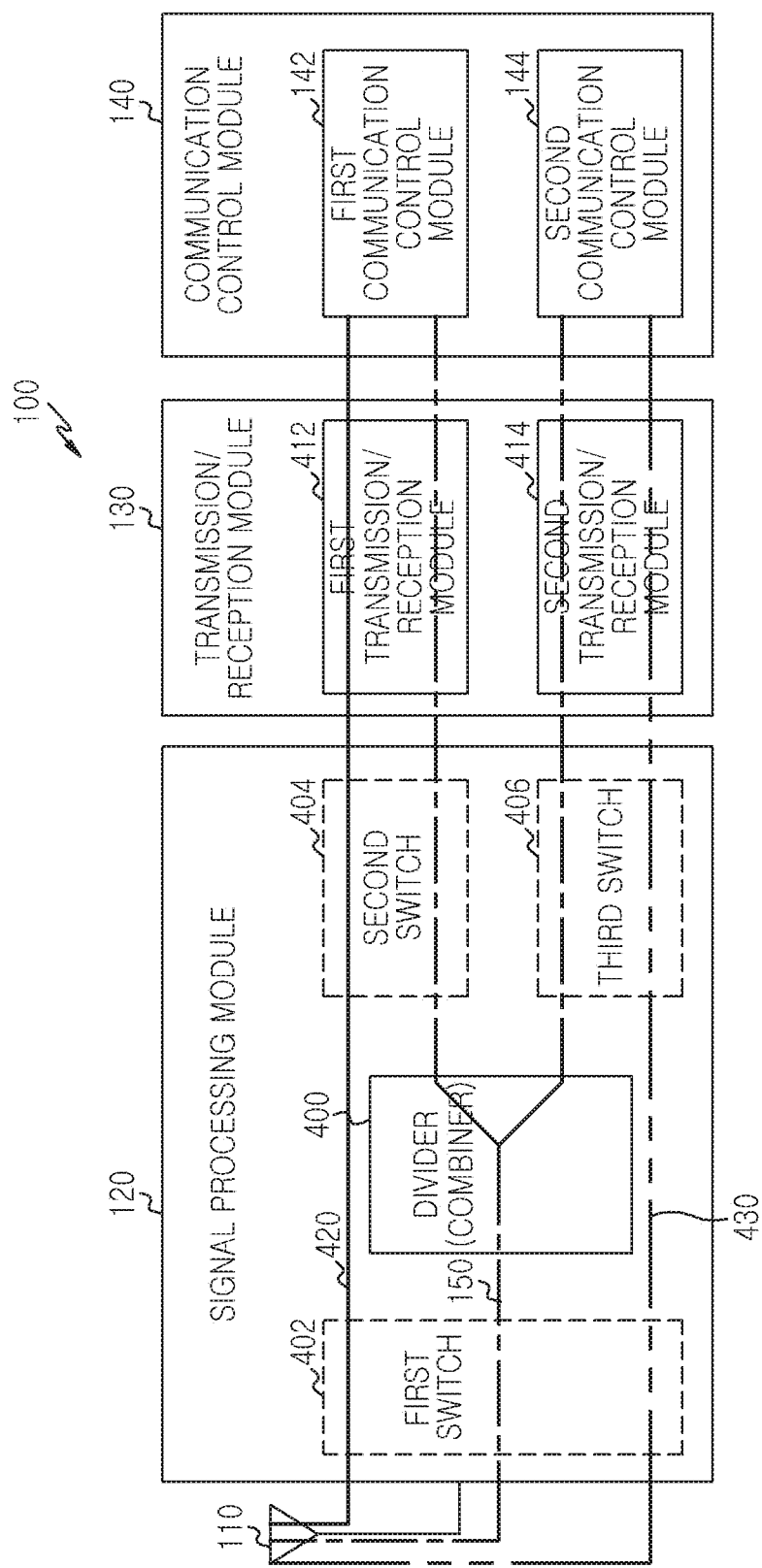
FIG. 4 is a detailed block diagram of a signal processing module according to an embodiment of the present disclosure.

FIG. 4 is a detailed block diagram of the signal processing module according to an embodiment of the present disclosure.

Referring to FIG. 4, the signal processing module 120 of the electronic device 100 may include a divider 400 (for example, the divider 122), a first switch 402, a second switch 404, and a third switch 406. In the signal processing module 120 of FIG. 4, the first switch 402, the second switch 404, and the third switch 406 which are marked by dotted lines may be omitted.

The first switch 402 may control a connection of the antenna 110 according to, for example, a service (for example, a voice call service, a data service, or a plurality of communication services) provided by the electronic device 100. According to one embodiment, the first switch 402 may connect the antenna 110 to the first communication control module 142 through, for example, the second switch 404 based on, for example, provision of the voice call service (or the data service) using the first communication network (for example, the CS network) by the electronic device 100. For example, when the antenna 110 receives the signal of the CS network, the first switch 402 may connect the antenna 110 to the first communication control module 142 through the second switch 404 in order to transmit the signal of the CS network received through the antenna 110 to the first communication control module 142(420).

According to one embodiment, the first switch 402 may connect the antenna 110 to the second communication control module 144 through, for example, the third switch 406 based on, for example, provision of the data service or the voice call service using the second communication network (for example, the PS network) by the electronic device 100. For example, when the antenna 110 receives the signal of the PS network, the first switch 402 may connect the antenna 110 to the second communication control module 144 through the third switch 406 in order to transmit the signal of the PS network received through the antenna 110 to the second communication control module 144(430).

According to one embodiment, the first switch 402 may connect the antenna 110 to the divider/combiner 400 based on provision of a plurality of communication services (for example, the voice call service using the CS network and the data service using the PS network) by the electronic device 100. For example, when the antenna 110 receives the signal of the CS network and the signal of the PS network, the first switch 402 may connect the antenna 110 to the divider/combiner 400 in order to transmit the signal of the CS network and the signal of the PS network which are received through the antenna 110 to the first communication control module 142 and the second communication control module 144 as indicated by reference numeral 150.

The second switch 404 may control the connection of the first communication control module 142 according to the service provided by the electronic device 100. According to one embodiment, the second switch 404 may connect the antenna 110 to the first communication control module 142 through the first switch 402 based on provision of the voice call service using the first communication network (for example, the CS network) by the electronic device 100. For example, when the first communication control module 142 transmits the signal of the CS network, the second switch 404 may connect the first communication control module 142 to the antenna 110 through the first switch 402 in order to transmit the signal of the CS network to be transmitted, to the antenna 110 as indicated by reference numeral 420.

According to one embodiment, when the electronic device 100 provides a plurality of communication services, the second switch 404 may connect the first communication control module 142 to the divider/combiner 400. For example, when the first communication control module 142 transmits the signal of the CS network and the second communication control module 144 transmits the signal of the PS network, the second switch 404 may connect the first communication control module 142 to the divider/combiner 400 in order to transmit the signal of the CS network to be transmitted, to the antenna 110 as indicated by reference numeral 150.

The third switch 406 may control a connection of the second communication control module 144 according to the service provided by the electronic device 100. According to one embodiment, the third switch 406 may connect the second communication control module 144 to the antenna 110 based on provision of the voice call service or the data service using the second communication network (for example, the PS network) by the electronic device 100. For example, when the second communication control module 144 transmits the signal of the PS network, the third switch 406 may connect the second communication control module 144 to the antenna 110 through the first switch 402 in order to transmit the signal of the PS network to be transmitted, to the antenna 110 as indicated by reference numeral 430.

According to one embodiment, when the electronic device 100 provides a plurality of communication services, the third switch 406 may connect the second communication control module 144 to the divider/combiner 400. For example, when the first communication control module 142 transmits the signal of the CS network and the second communication control module 144 transmits the signal of the PS network, the third switch 406 may connect the second communication control module 144 to the divider/combiner 400 in order to transmit the signal of the PS network to be transmitted, to the antenna 110 as indicated by reference numeral 150.

According to one embodiment, when the electronic device provides a plurality of communication services, the divider 400 may distribute and provide the signals transmitted by the antenna 110 through the first switch 402 to the first communication control 142 and the second communication control module 144 through, for example, the second switch 404 and the third switch 406. Further, the divider/combiner 400 may combine the signals provided from the first communication control module 142 and the second communication control module 144 through the second switch 404 and the third switch 406 into one signal, and transmit the combined signal to the antenna 110 through, for example, the first switch 402.

Although not illustrated, the electronic device 100 may further include a switch controller for controlling at least one of the first switch 402, the second switch 404, and the third switch 406 according to the service provided by the electronic device 100. For example, the switch controller may be included in the signal processing module 120 or may be configured by a module separated from the signal processing module 120.

For convenience of description, although it has been described that the signal processing module 120 includes the switches 402, 404, and 406, and the divider/combiner 400 in the aforementioned embodiment, the present disclosure is not limited thereto.

According to one embodiment, the signal processing module 120 may include the first switch 402 and the divider/combiner 400. Further, the signal processing module 120 may include the second switch 404 or the third switch 406, and the divider/combiner 400.

Figure 5:
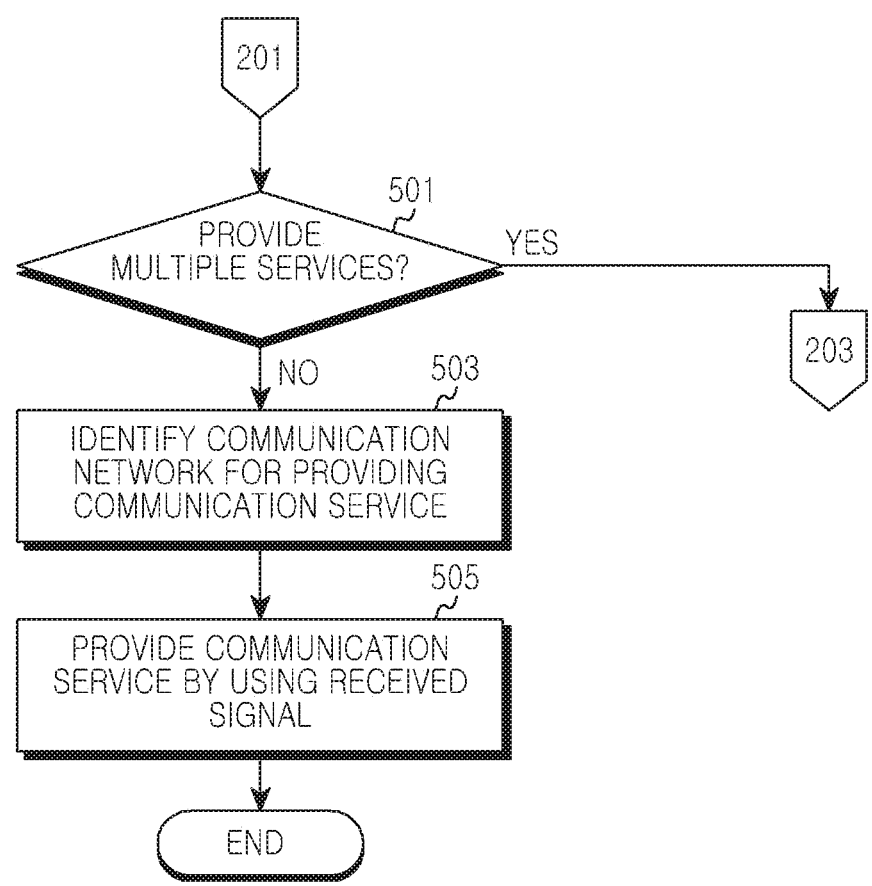
FIG. 5 illustrates a process in which an electronic device provides a plurality of communication services according to an embodiment of the present disclosure.

FIG. 5 illustrates a process in which an electronic device provides a plurality of communication services according to an embodiment of the present disclosure.

Referring to FIG. 5, when the signal of the first communication network (for example, the CS network) and the signal of the second communication network (for example, the PS network) are received through the antenna (for example, the antenna 110) in operation 201 of FIG. 2, the electronic device may identify whether a plurality of communication services are provided in operation 501.

When the plurality of communication services are provided in operation 501, the electronic device may divide the signals received through the antenna (for example, the antenna 110) into a plurality of signals by using, for example, the divider 400 of the signal processing module (for example, the signal processing module 120) in operation 203 of FIG. 2. According to one embodiment, when the electronic device 100 provides a plurality of communication services, the electronic device 100 may connect the antenna 110 to the divider/combiner 400 through the first switch 402. The divider/combiner 400 may distribute and provide the signals received from the antenna 110 through the first switch 402 to the first communication control 142 and the second communication control module 144 through, for example, the second switch 404 and the third switch 406.

When the plurality of communication services are not provided in operation 501 (for example, when the voice call service using the first communication network or the data service using the second communication network is provided), the electronic device may identify the service provided by the electronic device in operation 503. According to one embodiment, the electronic device may identify the communication network (for example, the first communication network or the second communication network) for providing the service.

The electronic device may provide the communication service by using the communication control module (for example, the first communication control module 142 or the second communication control module 144) corresponding to the communication network for providing the service in operation 505. According to one embodiment, when the electronic device 100 provides the voice call service (or the data service) using the first communication network (for example, the CS network), the electronic device 100 may connect the antenna 110 to the first communication control module 142 through the first switch 402 and the second switch 404. The first communication control module 142 may provide the communication service (for example, the voice call service) using the first communication network by demodulating the signal of the first communication network provided from the antenna 110. According to one embodiment, when the electronic device 100 provides the data service or the voice call service using the second communication network (for example, the PS network), the electronic device 100 may connect the antenna 110 to the second communication control module 144 through the first switch 402 and the third switch 406. The second communication control module 144 may provide the communication service (for example, the data service or the voice call service) using the second communication network by demodulating the signal of the second communication network provided from the antenna 110.

Figure 6:
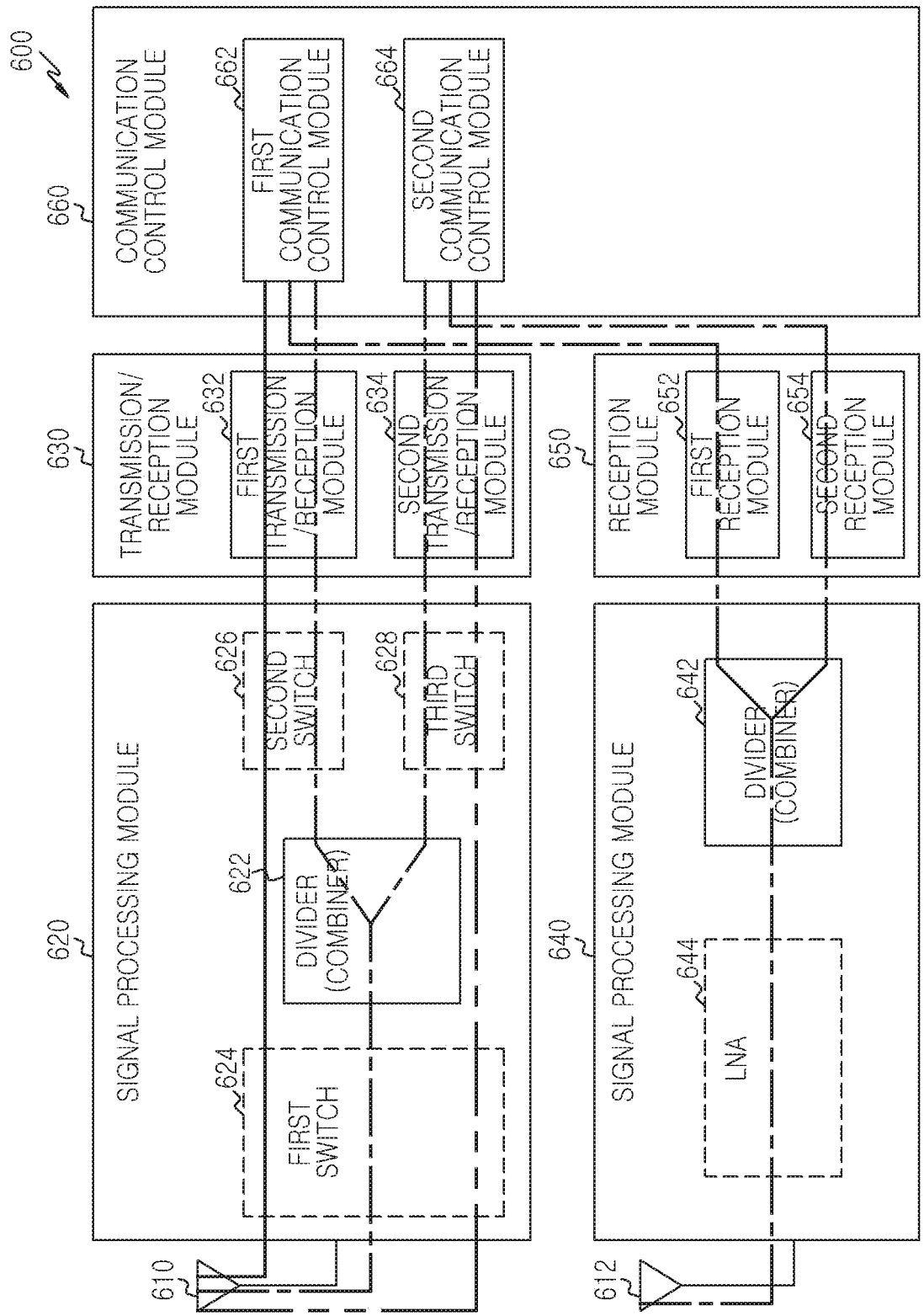
FIG. 6 is a block diagram of an electronic device according to an embodiment of the present disclosure.

In the above described embodiment, when the voice call service or the data service is provided using the signal processing module 120 as illustrated in FIG. 4, the electronic device 100 may receive a paging signal by using a secondary antenna as illustrated in FIG. 6.

FIG. 6 is a block diagram of an electronic device according to an embodiment of the present disclosure.

Referring to FIG. 6, an electronic device 600 may include a main antenna 610 (for example, the antenna 110), a first signal processing module 620 (for example, the first signal processing module 120), a transmission/reception module 630 (for example, the transmission/reception module 130), a secondary antenna 612, a second signal processing module 640, a reception module 650, and a communication control module 660 (for example, the communication control module 140).

The main antenna 610 and the secondary antenna 612 may be functionally connected to the electronic device 600 to transmit/receive signals for one or more communication services (for example, a voice call service or a data service) which may be provided by the electronic device 600. According to one embodiment, the main antenna 610 and the secondary antenna 612 may simultaneously or sequentially transmit or receive at least one of the signal of the first communication network and the signal of the second communication network.

According to one embodiment, at least one of the main antenna 610 and the secondary antenna 612 functionally connected to the electronic device 600 may include, for example, an antenna included in the electronic device 600 or an antenna included in an external device which communicates with the electronic device 600.

The first signal processing module 620 may include a divider 622, a first switch 624, a second switch 626, and a third switch 628. For example, the configuration of the first signal processing module 620 may be identical or similar to the configuration of the signal processing module 120 of FIG. 4.

The transmission/reception module 630 may control an operation of transmitting a signal to the main antenna 610 and an operation of receiving a signal from the main antenna 610. For example, the transmission/reception module 630 may include a first transmission/reception module 632 and a second transmission/reception module 634 which are logically or physically separated from each other.

For example, the first transmission/reception module 632 may change a Radio Frequency (RF) signal provided from the first signal processing module 620 into a baseband signal and transmit the baseband signal to the first communication control module 662. The first transmission/reception module 632 may change an analog signal of the baseband for the first communication network provided from the first communication control module 662 into the RF signal and transmit the RF signal to the first signal processing module 620.

For example, the second transmission/reception module 634 may change a Radio Frequency (RF) signal provided from the first signal processing module 620 into a baseband signal and transmit the baseband signal to the second communication control module 664. The second transmission/reception module 634 may change an analog signal of the baseband for the second communication network provided form the second communication control module 664 into the RF signal and transmit the RF signal to the first signal processing module 620.

The second signal processing module 640 may include a divider 642. The divider 642 may distribute and provide the signal received by the signal processing module 640 through the secondary antenna 612 to each of the first communication control module 662 and the second communication control module 664. For example, the divider 642 may divide at least one of the paging signal of the first communication network and the paging signal of the second communication network which are received by the second signal processing module 640 through the secondary antenna 612 and transmit the divided signals to the first communication control module 662 and the second communication control module 664 through the reception module 650.

Additionally or alternatively, according to one embodiment, the second signal processing module 640 may further include an amplifier (for example, a Low Noise Amplifier (LNA)) between, for example, the secondary antenna 612 and the divider 642 in order to compensate for transmission performance loss.

The reception module 650 may control an operation of receiving a signal from the secondary antenna 612. For example, the reception module 650 may include a first reception module 652 and a second reception module 654 which are logically or physically separated from each other.

For example, the first reception module 652 may change an RF signal provided from the second signal processing module 640 into a baseband signal and transmit the baseband signal to the first communication control module 662.

For example, the second reception module 654 may change an RF signal provided from the second signal processing module 640 into the baseband signal and transmit the baseband signal to the second communication control module 664.

The communication control module 660 may process (for example, demodulate) signals of one or more communication networks included in the signals received through the transmission/reception module 630. For example, the communication control module 660 may include the first communication control module 662 and the second communication control module 664, which are logically or physically separated from each other, so as to process (for example, demodulate) signals of a plurality of communication networks.

Additionally or alternatively, according to one embodiment, the communication control module 660 may receive the paging signals for one or more communication networks through the reception module 650.

According to one embodiment, when the electronic device 600 provides the voice call service (or the data service) using the first communication network (for example, the CS network), the first communication control module 662 of the electronic device 600 may be connected to the main antenna 610 through the first switch 624 and the second switch 626. The first communication control module 662 may provide the communication service (for example, the voice call service) using the first communication network by demodulating the signal of the first communication network provided from the main antenna 610. In this case, the second communication control module 664 may identify whether the paging signal for the second communication network is received from the reception module 650.

According to one embodiment, when the electronic device 600 provides the voice call service or the data service using the second communication network (for example, the PS network), the second communication control module 664 of the electronic device 600 may be connected to the main antenna 610 through the first switch 624 and the third switch 628. The second communication control module 664 may provide the communication service (for example, the voice call service) using the second communication network by demodulating the signal of the second communication network provided from the main antenna 610. In this case, the first communication control module 662 may identify whether the paging signal for the first communication network is received from the reception module 650.

Although not illustrated, the electronic device 600 may further include a service control module for making a control to change the service (for example, the voice call service or the data service) provided from the electronic device 600 according to the type of paging signal (for example, the signal of the first communication network or the signal of the second communication network) received by at least one of the first communication control module 662 and the second communication control module 664.

For example, when the electronic device receives the paging signal for the second communication network (for example, the PS network) through the second communication control module 664 while providing the voice call service through the first communication network (for example, the CS network) by using the first communication control module 662, the service control module may switch the service provided by the electronic device 600 to a plurality of communication services from the voice communication service.

For example, when the electronic device receives the paging signal for the first communication network (for example, the CS network) through the first communication control module 662 while providing the data service through the second communication network (for example, the PS network) by using the second communication control module 664, the service control module may switch the service provided by the electronic device 600 to a plurality of communication services from the data service.

According to one embodiment, the electronic device 600 may receive the paging signal through the secondary antenna 612. For example, the secondary antenna 612 of the electronic device 600 may include a first secondary antenna for receiving the signal of the first communication network and a second secondary antenna for receiving the signal of the second communication network.

According to various embodiments of the present disclosure, the electronic device (for example, the electronic device 600) may include the an antenna (for example, the main antenna 610) for transmitting or receiving one or more of a first signal corresponding to the first communication network (for example, the CS network) and a second signal corresponding to the second communication network (for example, the PS network), a first communication control module (for example, the first communication control module 662) for processing the first signal, a second communication control module (for example, the second communication control module 664) for processing the second signal, and a divider (for example, the divider 622) for distributing the one or more signals received through the antenna to the first communication control module and the second communication control module.

In embodiments of the present disclosure, when a first service (for example, the voice call service) corresponding to the first signal and a second service (for example, the data service) corresponding to the second signal are provided, the first communication control module and the second communication control module may be configured to receive the one or more signals through the divider.

In embodiments of the present disclosure, the electronic device may further include a switch (for example, the first switch 624) for connecting the antenna to at least one of the divider, the first communication control module, and the second communication control module based on the service provided by the electronic device.

In embodiments of the present disclosure, the antenna may be connected to the first communication control module when the service includes the first service provided through the first communication control module, and the antenna may be connected to the second communication control module when the service includes the second service provided through the second communication control module.

In embodiments of the present disclosure, when the service includes the first service provided through the first communication control module and the second service provided through the second communication module, the switch may be configured to connect the antenna to the divider.

In embodiments of the present disclosure, the electronic device may further include a switch (for example, the second switch 626) for connecting the first communication control module to the divider when the first service provided through the first communication control module and the second service provided through the second communication control module are provided, and connecting the first communication control module to the antenna when only the first service is provided.

In embodiments of the present disclosure, the electronic device may further include a switch (for example, the third switch 628) for connecting the second communication control module to the divider when the first service provided through the first communication control module and the second service provided through the second communication control module are provided, and connecting the second communication control module to the antenna when only the second service is provided.

In embodiments of the present disclosure, the divider may be configured to combine the first signal transmitted from the first communication control module and the second signal transmitted from the second communication control module.

In embodiments of the present disclosure, a first frequency band corresponding to the first signal and a second frequency band corresponding to the second signal may include designated frequency ranges.

In embodiments of the present disclosure, the electronic device may further include an amplifier for amplifying the one or more signals to be transmitted to the divider.

In embodiments of the present disclosure, the electronic device may further include a secondary antenna (for example, the secondary antenna 612) for receiving paging signals corresponding to the one or more signals.

In embodiments of the present disclosure, the electronic device may further include another divider (for example, the divider 642) for distributing the paging signals to the first communication control module and the second communication control module.

Figure 7:
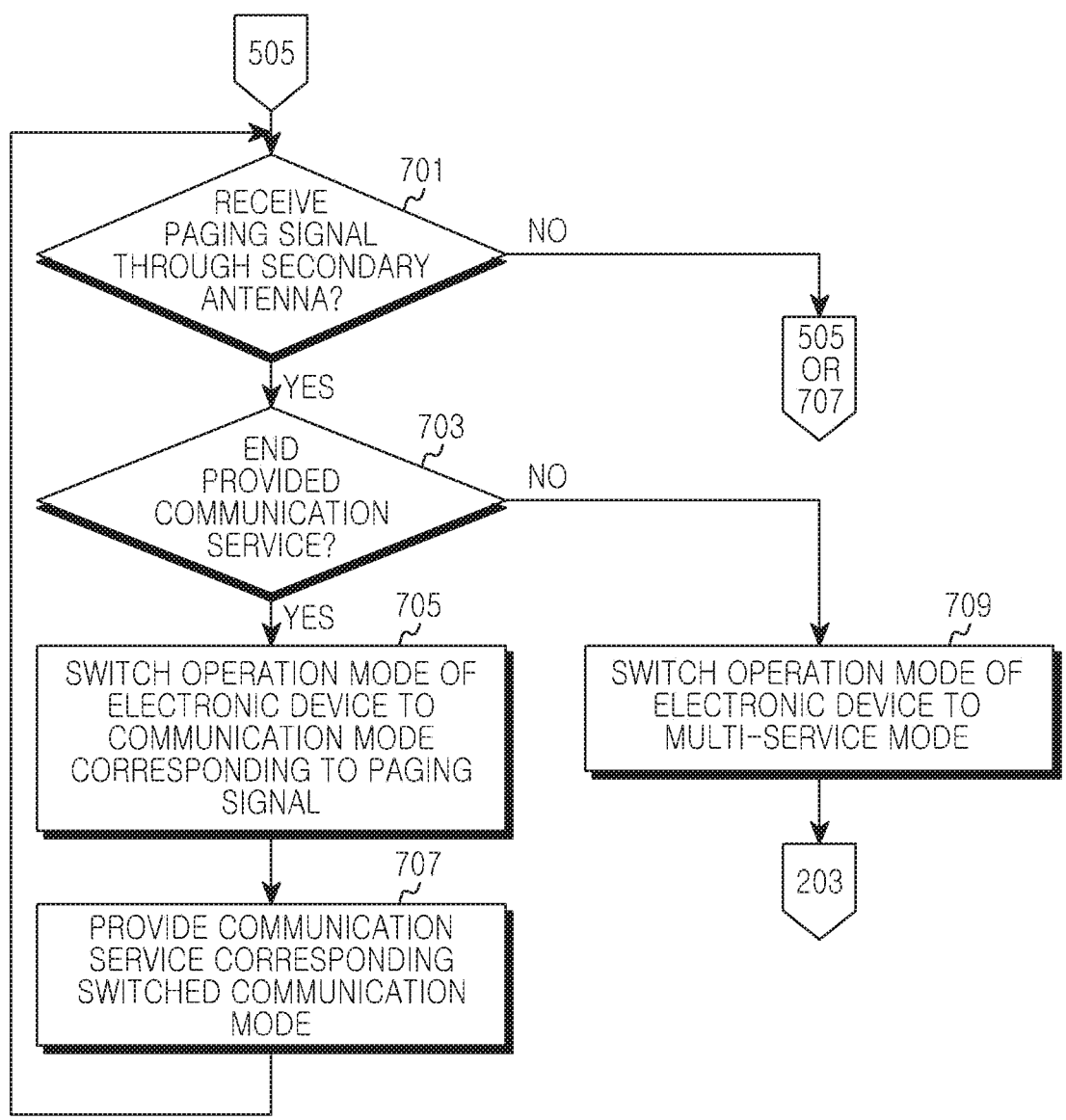
FIG. 7 illustrates a process in which an electronic device provides a plurality of communication services according to an embodiment of the present disclosure.

FIG. 7 illustrates a process in which the electronic device provides a plurality of communication services (for example, a voice call service and a data service) according to an embodiment of the present disclosure.

Referring to FIG. 7, when a first communication service (for example, the voice call service) is provided using the signal of the first communication network received through the antenna (for example, the main antenna 610) or a second communication service (for example, the data service) is provided using the signal of the second communication network in operation 505 of FIG. 5, the electronic device (for example, the electronic device 600) may identify whether a paging signal is received through the secondary antenna (for example, the secondary antenna 612) in operation 701. According to one embodiment, for example, when the electronic device 600 provides the voice call service (or the data service) using the first communication network (for example, the CS network), the electronic device 600 may identify whether a paging signal for the second communication network is received through the secondary antenna 612. According to one embodiment, for example, when the electronic device 600 provides the voice call service or the data service using the second communication network (for example, the PS network), the electronic device 600 may identify whether a paging signal for the first communication network is received through the secondary antenna 612.

When the paging signal is not received in operation 701, the electronic device may provide the voice call service by using the signal of the first communication network through the antenna (for example, the main antenna 610) or provide the data service by using the signal of the second communication network in operation 505 of FIG. 5.

When the paging signal is received in operation 701, the electronic device may determine whether to end the first communication service which is being provided by the electronic device at the time when the paging signal is received in operation 703. For example, the electronic device 600 may determine whether to end the first communication service based on whether the electronic device 600 supports a plurality of communication services.

When the electronic device determines not to end the provided communication service in operation 703 (for example, determines to provide a plurality of communication services), the electronic device may divide the signal received through the antenna (for example, the antenna 110) into a plurality of signals by using the divider 400 of the signal processing module (for example, the signal processing module 120) in operation 203 of FIG. 2. For example, the electronic device may divide the signal received through the antenna (for example, the antenna 110) into a plurality of signals by using the divider 400 of the signal processing module (for example, the signal processing module 120) in operation 203 of FIG. 2 after switching the mode thereof to a communication mode for providing the plurality of communication services.

When the electronic device determines to stop the provided communication service in operation 703 (for example, a plurality of communication services are not provided), the electronic device may switch the service of the electronic device so as to provide the service corresponding to the paging signal in operation 705.

The electronic device may provide a communication service corresponding to the switched service in operation 707.

Figure 8:
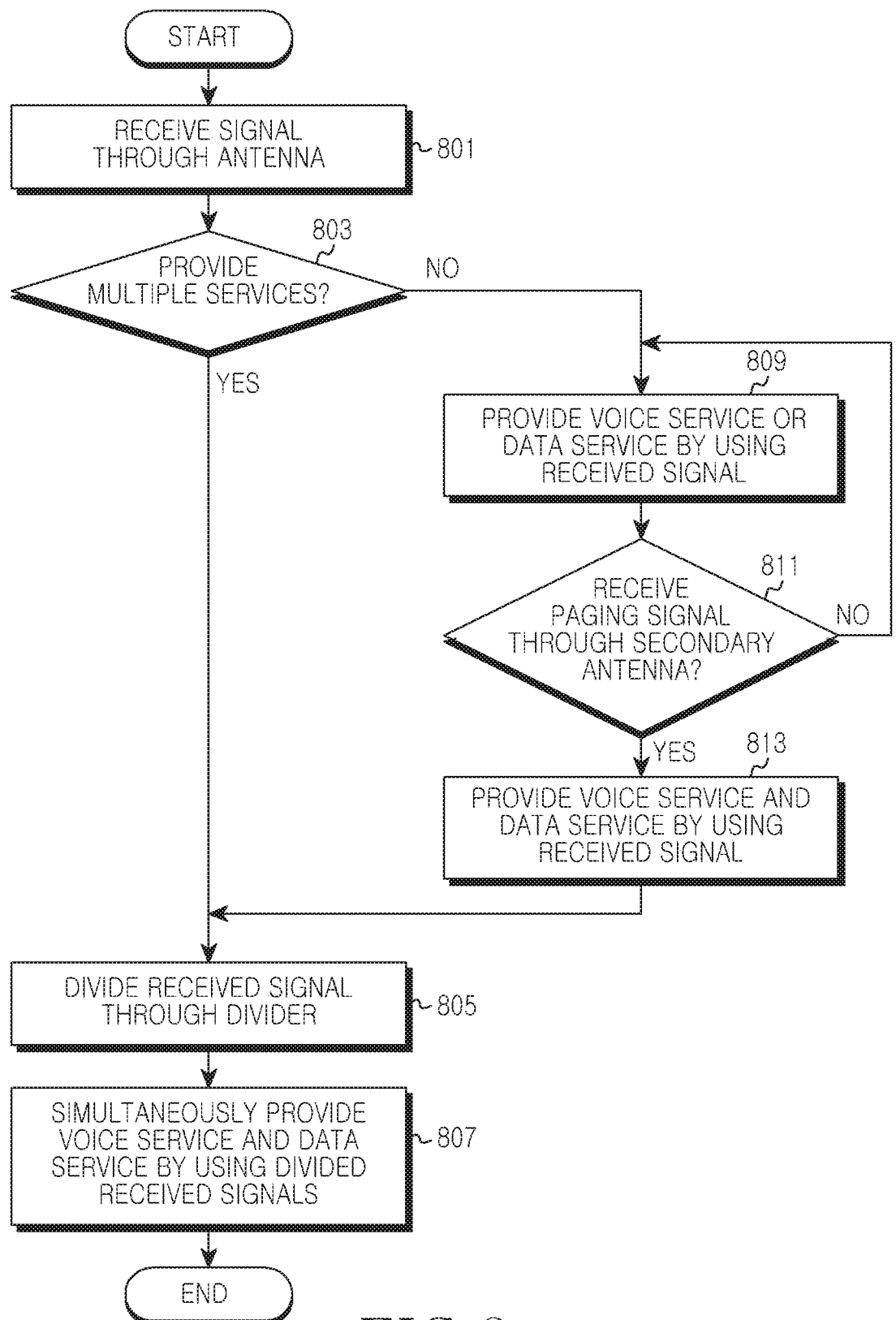
FIG. 8 illustrates a process in which an electronic device provides a plurality of communication services according to an embodiment of the present disclosure.

FIG. 8 illustrates a process in which an electronic device provides a plurality of communication services according to an embodiment of the present disclosure.

Referring to FIG. 8, the electronic device (for example, the electronic device 600) may receive a signal through the main antenna (for example, the main antenna 610) in operation 801. For example, the electronic device 600 may receive signals including at least one of the signal of the first communication network and the signal of the second communication network through the main antenna 610.

When the signal is received through the main antenna, the electronic device may identify whether a plurality of communication services are provided in operation 803.

When the plurality of communication services are provided in operation 803, the electronic device may divide the signal received through the main antenna into a plurality of signals by using the signal processing module 620 in operation 805. According to one embodiment, for example, when the electronic device 600 provides a plurality of communication services, the electronic device 600 may connect the main antenna 610 to the divider/combiner 622 through the first switch 624. The divider/combiner 622 may distribute and provide the signal received from the main antenna 610 through the first switch 624 to the first communication control 662 and the second communication control module 664 through, for example, the second switch 626 and the third switch 628.

The electronic device may simultaneously provide a service using the first communication network (for example, a voice call service) and a service using the second communication network (for example, a data service) by using each of the signals divided through the signal processing module 620 in operation 807.

When the plurality of communication services are not provided in operation 803, the electronic device may provide the voice call service using the first communication network or the data service using the second communication network based on the signal received through the main antenna in operation 809.

The electronic device may identify whether a paging signal is received through the secondary antenna in operation 811.

When the paging signal is not received in operation 811, the electronic device may provide the voice call service by using the signal of the first communication network received through the main antenna (for example, the main antenna 610) or provide the data service by using the signal of the second communication network in operation 809.

When the paging signal is received in operation 811, the electronic device may switch the service of the electronic device so as to provide a plurality of communication services in operation 813.

When the service of the electronic device is switched to provide the plurality of communication services, the electronic device may divide the signal received through the main antenna into a plurality of signals by using the signal processing module 620 in operation 805.

According to various embodiments of the present disclosure, a method of operating the electronic device (for example, the electronic device 600) may include an operation of transmitting or receiving one or more of the first signal corresponding to the first communication network and the second signal corresponding to the second communication network through the antenna (for example, the main antenna 610) functionally connected to the electronic device and an operation of distributing the one or more received signals to the first communication control module (for example, the first communication control module 662) for processing the first signal and the second communication control module (for example, the second communication control module 664) for processing the second signal through the divider (for example, the divider 622) functionally connected to the electronic device.

In embodiments of the present disclosure, the operation of distributing the one or more received signals may be an operation performed by the electronic device based on provision of the first service (for example, the voice call service) provided through the first communication control module and the second service (for example, the data service) provided through the second communication control module.

In embodiments of the present disclosure, the method may further include an operation of transmitting the one or more signals received through the antenna to the first communication control module when the electronic device provides only the first service, and transmitting the one or more signals received through the antenna to the second communication control module when the electronic device provides only the second service.

In embodiments of the present disclosure, the method may further include an operation of combining the first signal transmitted from the first communication control module and the second signal transmitted from the second communication control module into one signal.

In embodiments of the present disclosure, the method may further include an operation of receiving paging signals corresponding to the one or more signals.

In embodiments of the present disclosure, the method may further include an operation of distributing the paging signals to the first communication control module and the second communication control module.

In embodiments of the present disclosure, the method may further include an operation of providing a service corresponding to at least one of the first signal and the second signal by the electronic device based on the paging signals.

Figure 9:
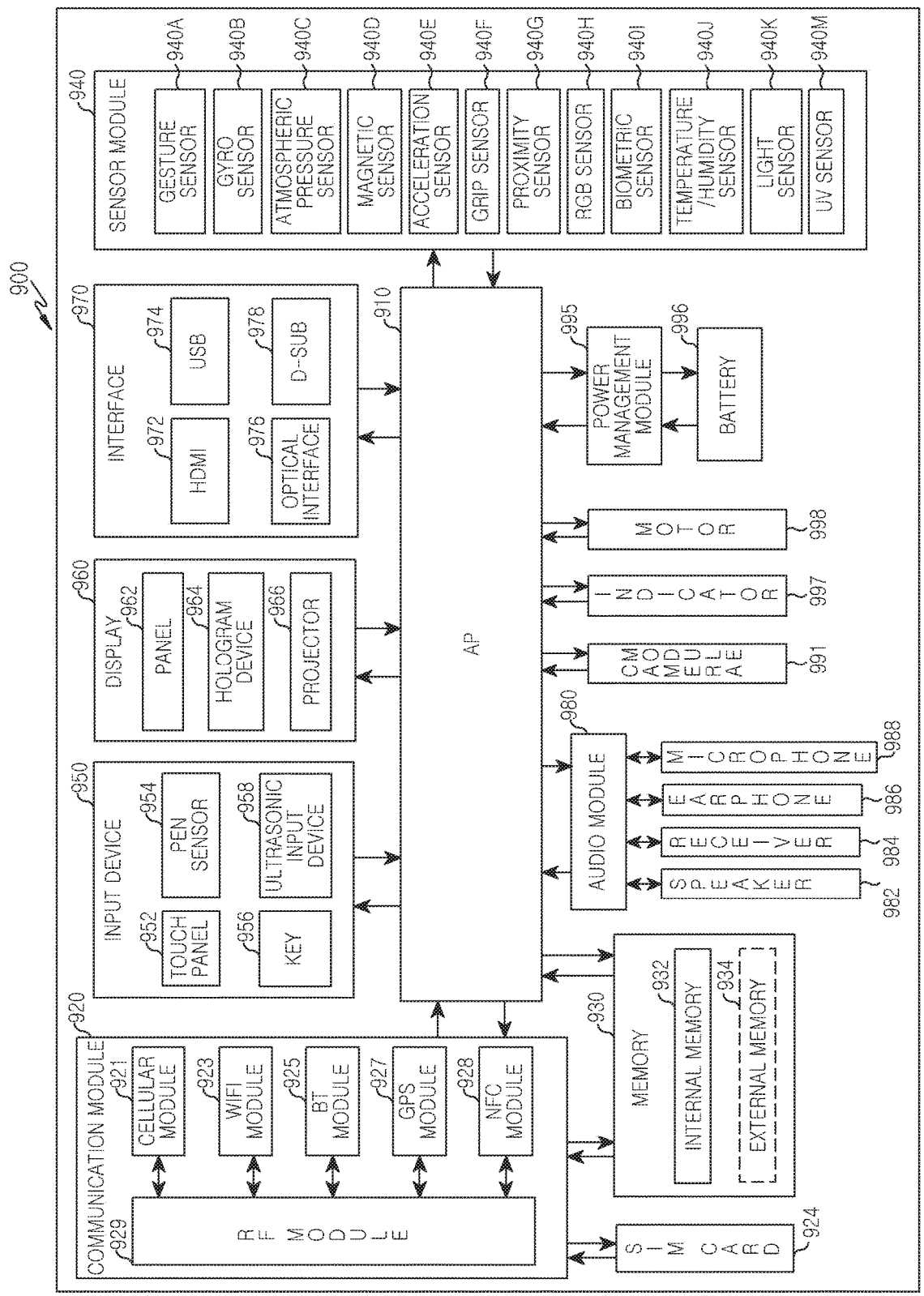
FIG. 9 is a block diagram of an electronic device according to an embodiment of the present disclosure.

FIG. 9 is a block diagram of an electronic device according to an embodiment of the present disclosure.

An electronic device 900 may constitute, for example, all or a part of the electronic device 100 illustrated in FIG. 1 or FIG. 3 or the electronic device 600 illustrated in FIG. 6. Referring to FIG. 9, the electronic device 900 may include one or more Application Processors (APs) 910, a communication module 920, a Subscriber Identifier Module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may drive an operating system or an application program so as to control a plurality of hardware or software components connected to the AP 910, and may process various pieces of data including multimedia data and perform calculations. The AP 910 may be implemented by, for example, a System on Chip (SoC). According to one embodiment, the AP 910 may further include a Graphic Processing Unit (GPU).

The communication module 920 may transmit and receive data in communication between the electronic device 900 (for example, the electronic device 100 or 600) and other electronic devices connected through a network. According to one embodiment, the communication module 920 may include a cellular module 921, a WiFi module 923, a BlueTooth (BT) module 925, a Global Positioning System (GPS) module 927, a Near Field Communication (NFC) module 928, and a Radio Frequency (RF) module 929.

The cellular module 921 may provide a voice, a call, a video call, a Short Message Service (SMS), or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 921 may distinguish and authenticate electronic devices within a communication network using a subscriber identification module (for example, the SIM card 924). According to one embodiment, the cellular module 921 may perform at least some of the functions which can be provided by the AP 910. For example, the cellular module 921 may perform at least some of the multimedia control functions.

According to one embodiment, the cellular module 921 may include a Communication Processor (CP). Furthermore, the cellular module 921 may be implemented by, for example, an SoC. Although the components such as the cellular module 921 (for example, communication processor), the memory 930, and the power management module 995 are illustrated as components separated from the AP 910, the AP 910 may include at least some of the above described components (for example, the cellular module 921) according to one embodiment.

According to one embodiment, the AP 910 or the cellular module 921 (for example, the communication processor) may load a command or data received from at least one of a non-volatile memory and other components connected to the AP 910 in a volatile memory and process the loaded command or data. Further, the AP 910 or the cellular module 921 may store data received from or generated by at least one of the other components in a non-volatile memory.

For example, each of the Wi-Fi module 923, the BT module 925, the GPS module 927, and the NFC module 928 may include a processor for processing data transmitted/received through the corresponding module. In FIG. 9, the cellular module 921, the WiFi module 923, the BT module 925, the GPS module 927, and the NFC module 928 are illustrated as blocks separated from each other, but at least some (for example, two or more) of the cellular module 921, the WiFi module 923, the BT module 925, the GPS module 927, and the NFC module 928 may be included in one Integrated Chip (IC) or one IC package. For example, at least some of processors corresponding to the cellular module 921, the WiFi module 923, the BT module 925, the GPS module 927, and the NFC module 928 respectively (for example, a CP corresponding to the cellular module 921 and a WiFi processor corresponding to the WiFi module 923) may be implemented as one SoC.

The RF module 929 may transmit/receive data, for example, an RF signal. The RF module 929 may include, for example, a transceiver, a Power Amp Module (PAM), a frequency filter, a Low Noise Amplifier (LNA), or the like, although not illustrated. Further, the RF module 929 may further include a component for transmitting/receiving an electromagnetic wave in the air for wireless communications, such as a conductor or a conducting wire. Although the cellular module 921, the Wi-Fi module 923, the BT module 925, the GPS module 927, and the NFC module 928 are illustrated to share one RF module 929 in FIG. 9, at least one of the cellular module 921, the Wi-Fi module 923, the BT module 925, the GPS module 927, and the NFC module 928 may transmit/receive the RF signal through a separate RF module.

The SIM card 924 may be a card including a subscriber identification module, and may be inserted into a slot formed in a particular portion of an electronic device. The SIM card 924 may include unique identification information (for example, an integrated circuit card identifier (ICCID)) or subscriber information (for example, an international mobile subscriber identity (IMSI)).

The memory 930 may include an internal memory 932 and an external memory 934. The internal memory 932 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to one embodiment of the present disclosure, the internal memory 932 may be a Solid State Drive (SSD). The external memory 934 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 934 may be functionally connected to the electronic device 900 through various interfaces. According to one embodiment, the electronic device 900 may further include a storage device (or storage medium) such as a hard drive.

The sensor module 940 may measure a physical quantity or detect an operation state of the electronic device 900, and may convert the measured or detected information into an electronic signal. The sensor module 940 may include, for example, at least one of a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (for example, red, green, and blue (RGB) sensor), a biometric sensor 940I, a temperature/humidity sensor 940J, an illumination sensor 940K, and an Ultra Violet (UV) sensor 940M. Additionally or alternatively, the sensor module 940 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor (not illustrated) and the like. The sensor module 940 may further include a control circuit for controlling one or more sensors included therein.

The input device 950 may include a touch panel 952, a (digital) pen sensor 954, a key 956, or an ultrasonic input device 958. The touch panel 952 may recognize a touch input through at least one of, for example, a capacitive type, a resistive type, an infrared type, and an acoustic wave type. The touch panel 952 may further include a control circuit. The capacitive type touch panel may recognize physical contact or proximity. The touch panel 952 may further include a tactile layer. In this case, the touch panel 952 may provide a user with a tactile reaction.

The (digital) pen sensor 954 may be embodied, for example, using a method identical or similar to a method of receiving a touch input of a user, or using a separate recognition sheet. The key 956 may include, for example, a physical button, an optical key, or a keypad. The ultrasonic input device 958 is a device that may identify data by generating an ultrasonic signal through an input tool (for example, a pen) and detecting a sonic wave through a microphone (for example, a microphone 988) in the electronic device 900, and is capable of wireless recognition. According to one embodiment, the electronic device 900 may use a communication module 920 to receive a user input from an external device (for example, a computer or a server) connected thereto.

The display 960 may include a panel 962, a hologram device 964 or a projector 966. For example, the panel 962 may be, for example, a Liquid Crystal Display (LCD), an Active Matrix Organic Light Emitting Diode (AM-OLED), or the like. The panel 962 may be implemented to be, for example, flexible, transparent, or wearable. The panel 962 may be configured by a single module together with the touch panel 952. The hologram device 964 may show a stereoscopic image in the air by using interference of light. The projector 966 may project light on a screen to display an image. The screen may be located, for example, inside or outside the electronic device 900. According to one embodiment, the display 960 may further include a control circuit for controlling the panel 962, the hologram device 964, or the projector 966.

The interface 970 may include, for example, a High-Definition Multimedia Interface (HDMI) 972, a Universal Serial Bus (USB) 974, an optical interface 976, or a D-subminiature (D-sub) 978. Additionally or alternatively, the interface 970 may include, for example, a Mobile High-definition Link (MHL) interface, a Secure Digital (SD) card/Multi-Media Card (MMC) interface, or an Infrared Data Association (IrDA) standard interface.

The audio module 980 may bidirectionally convert a sound and an electrical signal. The audio module 980 may process sound information which is input or output through, for example, a speaker 982, a receiver 984, earphones 986, the microphone 988 or the like.

The camera module 991 is a device which may photograph a still image and a dynamic image. According to one embodiment, the camera module 991 may include one or more image sensors (for example, a front sensor or a back sensor), a lens (not shown), an Image Signal Processor (ISP) (not shown) or a flash (not shown) (for example, LED or xenon lamp).

The power management module 995 may manage power of the electronic device 900. Although not illustrated, the power management module 995 may include, for example, a Power Management Integrated Circuit (PMIC), a charger Integrated Circuit (IC), or a battery or fuel gauge.

The PMIC may be mounted in, for example, an integrated circuit or an SoC semiconductor. The charging methods may be divided into a wired type and a wireless type. The charger IC may charge a battery and prevent the introduction of over-voltage or over-current from a charger. According to one embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, a residual quantity of the battery 996, and a voltage, a current, or a temperature during the charging. The battery 996 may store or generate electricity and may supply power to the electronic device 900 by using the stored or generated electricity. The battery 996 may include, for example, a rechargeable battery or a solar battery.

The indicator 997 may display a predetermined state of the electronic device 900 or a part of the electronic device 900 (for example, the AP 910), for example, a booting state, a message state, a charging state, or the like. The motor 998 may convert an electrical signal into a mechanical vibration. Although not illustrated, the electronic device 900 may include a processing device (for example, a GPU) for supporting mobile TV. The processing device for supporting mobile TV may process, for example, media data according to the standard of Digital Multimedia Broadcasting (DMB), Digital Video Broadcasting (DVB), a media flow, or the like.

According to various embodiments of the present disclosure, a computer-readable recording medium recording a program for executing, in an electronic device, an operation of transmitting or receiving one or more signals of a first signal corresponding to a first communication network and a second signal corresponding to a second communication network and an operation of distributing the one or more received signals to a first communication control module for processing the first signal and a second communication control module for processing the second signal through a divider functionally connected to the electronic device.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the command is executed by one or more processors, the one or more processors may perform a function corresponding to the command. The computer-readable storage medium may be, for example, the memory 260. At least some of the programming modules may be implemented (for example, executed) by, for example, the processor. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium storing commands is provided. The commands are configured to allow one or more processors to perform one or more operations when the commands are executed by the one or more processors. The one or more operations may include an operation of transmitting or receiving one or more signals of a first signal corresponding to a first communication network and a second signal corresponding to a second communication network and an operation of, when one or more signals are received, distributing the one or more signals to a first communication control module for processing the first signal and a second communication control module for processing the second signal based on services provided by the electronic device, which correspond to the first signal and the second signal.

An apparatus and a method for providing a communication service according to various embodiments may include a transmission/reception module for simultaneously providing a plurality of communication services (for example, a voice service and a data service) without using an additional antenna, so as to simultaneously provide the plurality of communication services without any increase in antenna volume.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:
1. An electronic device comprising:
 a first transceiver associated with a first cellular communication network;
 a second transceiver associated with a second cellular communication network different from the first cellular communication network;
 a first antenna configured to receive a first signal;
 a second antenna configured to receive a second signal, wherein the first antenna and the second antenna simul- taneously receive signals of the first cellular communication network and the second cellular communication network;

a low noise amplifier (LNA) operably coupled to the second antenna;

a divider configured to, while the first antenna and the divider are connected, divide the first signal into a first divided signal to be provided to the first transceiver and a second divided signal to be provided to the second transceiver by splitting power of the first signal, wherein a first frequency band corresponding to the first divided signal and a second frequency band corresponding to the second divided signal overlap each other, wherein the power of the first signal is unevenly split by the divider when generating the first divided signal and the second divided signal; and a switch configured to:
when a first service is provided and a second service is not provided, connect the first antenna to the first transceiver, and
when the first service and the second service are provided, connect the first antenna to the divider and transmit the first divided signal to the first transceiver and the second divided signal to the second transceiver, wherein, while the first service is provided and the second service is not provided, in response to receiving the second signal including a paging signal of the second cellular communication network through the second antenna, the switch is configured to connect the first antenna and the second transceiver or connect the first antenna and the divider.

2. The electronic device of claim 1, further comprising another divider connected with the second antenna and configured to divide the second signal into a third divided signal to be provided to a first receiver and a fourth divided signal to be provided to a second receiver.

3. The electronic device of claim 1, wherein the divider is further configured to combine a first transmission signal from the first transceiver and a second transmission signal from the second transceiver into a single transmission signal.

4. The electronic device of claim 1, wherein the first service includes a voice call service and the second service includes a data service.

5. The electronic device of claim 1, wherein the switch is further configured to:

when the first service is not provided and the second service is provided, connect the second antenna to the second transceiver for receiving.

6. The electronic device of claim 1, further comprising:
a second switch configured to connect the divider or the switch to the first transceiver; and
a third switch configured to connect the divider or the switch to the second transceiver.

7. A method of operating an electronic device, the method comprising:
receiving a first signal associated with at least one of a first service of a first cellular communication network or a second service of a second cellular communication network through a first antenna of the electronic device;
simultaneously receiving a second signal associated with at least one of the first service or the second service through a second antenna of the electronic device;
when the first service is provided and the second service is not provided, connecting the first antenna to a first transceiver associated with the first cellular communication network;
when the first service and the second service are provided, connecting the first antenna to a divider and transmitting a first divided signal to the first transceiver and a second divided signal to a second transceiver that are generated by the divider by splitting power of the first signal, wherein a first frequency band corresponding to the first divided signal and a second frequency band corresponding to the second divided signal overlap each other; and
while the first service is provided and the second service is not provided, in response to receiving the second signal including a paging signal of the second cellular communication network through the second antenna, a switch is configured to connect the first antenna and the second transceiver or connect the first antenna and the divider,
wherein the power of the first signal is unevenly split by the divider when generating the first divided signal and the second divided signal.

8. The method of claim 7, wherein the first service includes a voice call service and the second service includes a data service.

9. The method of claim 8, further comprising:
when the first service is not provided and the second service is provided, connecting the second antenna to the second transceiver for receiving.

* * * * *